United States Patent [19]

Takayama

[11] Patent Number: 5,737,317
[45] Date of Patent: Apr. 7, 1998

[54] COMMUNICATION SYSTEM TESTING METHOD

[75] Inventor: Akira Takayama, Hamamatsu, Japan

[73] Assignee: Yamaha Corporation, Hamamatsu, Japan

[21] Appl. No.: 454,845

[22] Filed: May 31, 1995

Related U.S. Application Data

[62] Division of Ser. No. 243,088, May 16, 1994, abandoned, and a continuation of Ser. No. 445,764, Dec. 4, 1989, abandoned.

[30] Foreign Application Priority Data

Dec. 5, 1988 [JP] Japan ................... 63-307568
Dec. 5, 1988 [JP] Japan ................... 63-307569

[51] Int. Cl.⁶ ........................... H04J 1/16; H04J 3/14
[52] U.S. Cl. ................................... 370/249; 375/228
[58] Field of Search ........................ 375/224, 225, 375/226, 228, 221; 370/15, 16, 13, 16.1, 242, 244, 241, 249, 220; 371/20.5; 379/5

[56] References Cited

U.S. PATENT DOCUMENTS

| | | | |
|---|---|---|---|
| 3,889,109 | 6/1975 | Blessin | 371/20.5 |
| 4,355,386 | 10/1982 | Binz et al. | 370/13 |
| 4,768,202 | 8/1988 | Lacroix et al. | 370/13.1 |
| 4,860,281 | 8/1989 | Finley et al. | 370/25 |
| 4,980,887 | 12/1990 | Dively et al. | 371/20.5 |
| 4,993,045 | 2/1991 | Alfonso | 370/15 |
| 5,018,184 | 5/1991 | Abrams et al. | 370/15 |
| 5,146,453 | 9/1992 | Nagler et al. | 370/16 |
| 5,289,474 | 2/1994 | Purcell et al. | 370/15 |

FOREIGN PATENT DOCUMENTS

| | | | |
|---|---|---|---|
| 59-75739 | 3/1919 | Japan . | |
| 56-85956 | 7/1981 | Japan . | |
| 0113662 | 7/1982 | Japan | 371/20.5 |
| 0005642 | 1/1985 | Japan | 371/20.5 |
| 60-57747 | 12/1985 | Japan . | |
| 0164361 | 7/1986 | Japan | 379/5 |
| 63-42252 | 2/1988 | Japan . | |
| 0132251 | 5/1989 | Japan | 370/15 |
| 0173933 | 7/1989 | Japan | 370/15 |
| 61-24353 | 1/1990 | Japan . | |
| 0161837 | 6/1990 | Japan | 371/20.5 |

OTHER PUBLICATIONS

Bodart et al., Philps Telecommunication Review, vol. 36, No. 4 pp. 197–209, Nov. 1978.

IBM Tech. Disc. Bull., vol. 28, No. 12 pp. 5187–5189 May 1986.

"American National Standard for Telecommunications—Integrated Services Digital Network—Basic Access Interface for S and T Reference Points—Layer 1 Specification", (title page plus pp. 71–72 and bearing a designation TIEI/88–008R1.

"Integrated Services Digital Network (ISDN) Overall Network Aspects and Functions, ISDN User-Network Interfaces", vol. III, Fascicle III. 8, IXth Plenary Assembly, Melbourne, Nov. 14–25, 1988, Geneva 1989, (Title page plus pp. 229–230, 236–240).

*Primary Examiner*—Wellington Chin
*Assistant Examiner*—Jean B. Corrielus
*Attorney, Agent, or Firm*—Burns, Doane, Swecker & Mathis, LLP

[57] ABSTRACT

A communication system testing method for testing a communication unit including a communication line and components of a communication unit such as a terminal unit. In addition, a control apparatus includes pause control means and control means, both of which are incorporated in an integrated communication control circuit. When the integrated communication control circuit is in the pause state, the pause control means outputs a pause permission indicating signal and detecting signal. The control means discontinues the supply of the main-clock signal by outputting the detecting signal, thereby limiting energy consumption.

1 Claim, 6 Drawing Sheets

COMMUNICATION SYSTEM TESTING METHOD

This application is a divisional of now abandoned application Ser. No. 08/243,088 filed on May 16, 1994, for COMMUNICATION SYSTEM TESTING METHOD, and is a continuation application of now-abandoned application Ser. No. 07/445,764, filed on Dec. 4, 1989, for COMMUNICATION SYSTEM TESTING METHOD.

BACKGROUND OF THE INVENTION

1. Field of the invention

The present invention relates to a communication system testing method and a control apparatus for use in the testing method, communication unit, communication channel, and the like.

2. Prior Art

It is known that a communication system is tested by a method referred to as a loop-back test under the specification of the CCITT (Consulting Committee for International Telegraph and Telephone).

Figure 1:
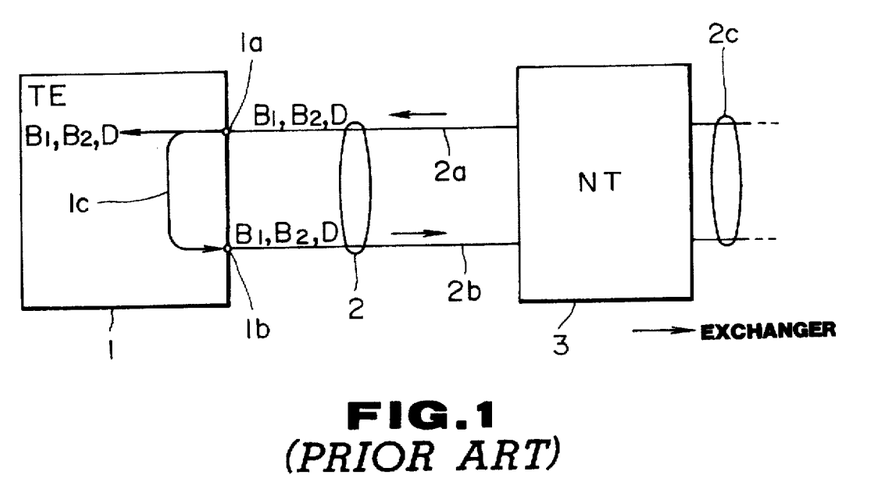
FIG. 1 is a block diagram showing a testing state of the communication unit in accordance with the conventional testing method.
Figure 2:
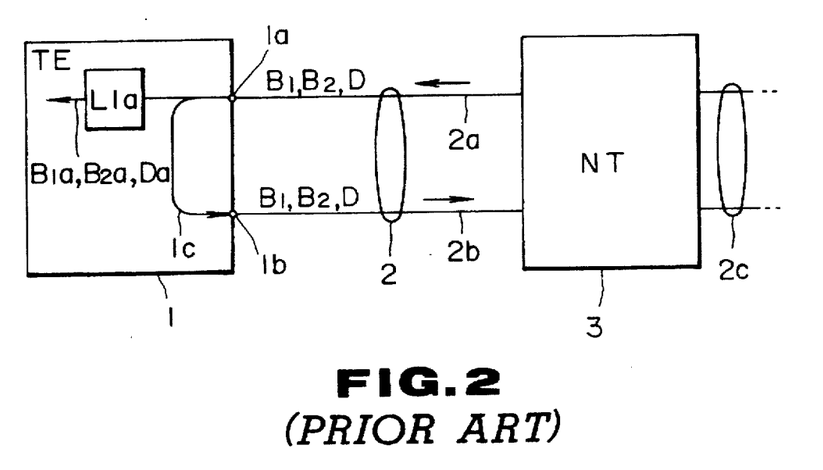
FIG. 2 is a block diagram showing another testing state of the communication unit in accordance with the conventional testing method.

FIGS. 1 and 2 show a simplified testing diagram. In FIG. 1, Numeral 1 designates terminal equipment which is connected to a network termination 3 through communication lines 2, and also network termination 3 is connected to an exchanger through other communication lines 2c. Terminal equipment 1 has at least one integrated communication control circuit which controls incoming and outgoing signals to communicate with other terminal equipment.

This communication system is of a time-division multiplex communication type. Thus, the operation of the communication unit including, for example, terminal equipment 1, network termination 3, and the like, is synchronized with a predetermined time referred to as a frame. The frame has a time interval of 250 µs divided into forty-eight time slots. If one of the time slots is unoccupied, this empty time slot is used for communication with other communication units.

During the communication line test, an internal signal line of terminal equipment 1 is switched to the test mode to execute the loop-back test for the communication lines 2. That is, in FIG. 1, test data $B_1$, $B_2$, D is supplied from network termination 3 to receiving terminal 1a through incoming line 2a. The data is supplied through a signal line 1c, and is output from transmitting terminal 1b to outgoing line 2b, and returns to the exchanger through network termination 3. Each name of the test data $B_1$, $B_2$, and D corresponds to the position of the time slot(channel) within the frame. Accordingly, the exchanger detects the test data $B_1$, $B_2$, and D returned from terminal equipment 1, thereby testing whether the communication line 2 has trouble from the exchanger to terminal equipment 1.

As shown in FIG. 2, during the loop-back test, a signal processor L1a executes signal processing, which is usually performed in a normal mode, on the test data R1, R2 and D. The function of the signal processor L1a is verified based on result data B1a, B2a and Da.

In such a case, when test data $B_1$, $B_2$, and D is transmitted from the exchanger to terminal equipment 1 through communication line 2c, network termination 3, and communication line 2, a digital clock signal generator is used to transmit these signals to terminal equipment 1, which is incorporated in a test control unit. However, the digital clock signal generator is not always generating the clock pulses. That is, when the testing operation is not executed, the digital clock signal generator pauses for a predetermined time. Thus, negligible current flows into the circuit of the digital clock signal generator during the pause, thereby allowing a reduction of the power consumption. On the other hand, in the pause, when the digital clock signal generator generates clock signals to actuate components of the circuit by dividing a main-clock signal which is generated from an oscillator incorporated in the digital clock signal generator, the frequency of the clock signal for actuating the components of the circuit is reduced in correspondence with the ratio of the dividing, thereby allowing reduction of the power consumption.

Accordingly, the continuity test of the communication lines can be executed by the loop-back test under the CCITT specification. However, components of the terminal equipment cannot be tested as to whether the components have defects or not in the loop-back test. In the pause, a request for communication cannot be received from other terminal equipment if the clock signal stops. Furthermore, when the dividing ratio of the clock signal is changed, the components of the circuits may be actuated during the pause, thereby changing states of the circuits from the previous states.

SUMMARY OF THE INVENTION

It is accordingly an object of the present invention to provide a communication system testing method capable of testing both components of a communication unit and a communication line.

It is another object of the present invention to provide a control apparatus for use in a communication system testing method capable of returning to the normal mode when a request for communication is received from other communication units during the pause.

In a first aspect of the present invention, there is provided a communication system testing method for testing a communication unit, the unit having terminal equipment including at least one integrated communication control circuit, wherein the terminal equipment is capable of being connected with other terminal equipment through a transit switch by communication lines, and having a normal mode and a test mode. In the normal mode, the terminal equipment processes a received signal from the other terminal equipment, and outputs a transmitted signal to the other terminal equipment through the communication line. A method in the test mode comprises steps of: inhibiting a signal processing of the received signal in the integrated communication control circuit; transmitting test data to the integrated communication control circuit; processing a test data by a first processor used for processing the transmitted signal in the normal mode for producing transmitted test data; forming a loop-back switch between communication lines; transferring the transmitted test data to a second processor used for processing the received signal in the normal mode for producing received test data through the loop-back switch; and comparing the received test data with the transmitted test data, thereby, testing the terminal equipment except integrated communication control circuit.

Accordingly, the communication line and each component of the integrated communication control circuit can be tested continuously, because test data is written into a storable circuit, then written test data is read from the storable circuit to compare written test data with read test data. Furthermore, data related to test data stored in another storable circuit is read from the storable circuit to add to a work register for comparing sum data with predetermined data, so that components, such as the storable circuits, can be tested whether they have defects or not.

In a second aspect of the present invention, a control apparatus is provided for use in the testing method. The control apparatus is incorporated in a communication unit which is connected with other communication units through a transit switch by communication lines for communicating with the other communication units. The communication unit have an integrated communication control circuit which has hierarchical sections corresponding to a hierarchical process of the communication unit. The communication unit includes pause control means for generating a pause permission indicating signal corresponding to the hierarchical section for executing a high hierarchical process by receiving a main-clock signal, and for generating a detecting signal when the integrated communication control circuit is in a pause state waiting for a request for communication from the other communication units; and control means for stopping supply of the main-clock signal to each component of the integrated communication control circuit when the pause control means outputs the detecting signal, and indicates the supply of the main-clock signal to each component of the integrated communication control circuit when the detecting signal is no longer output from the pause control means.

Accordingly, when the integrated communication control circuit is paused, the pause control means generates a pause permission indicating signal. Furthermore, when a communication demand is not requested from other communication units, the pause control means also generates a detecting signal. The detecting signal stops output of the main-clock signal by the control means, so that energy consumption can be reduced. Furthermore, when output of the detecting signal is discontinued from the pause control means, the control means directs supply of the main-clock signal to each component of the integrated communication control circuit, so that a communication process can be immediately returned to the normal operation.

DESCRIPTION OF THE PREFERRED EMBODIMENTS

Figure 3:
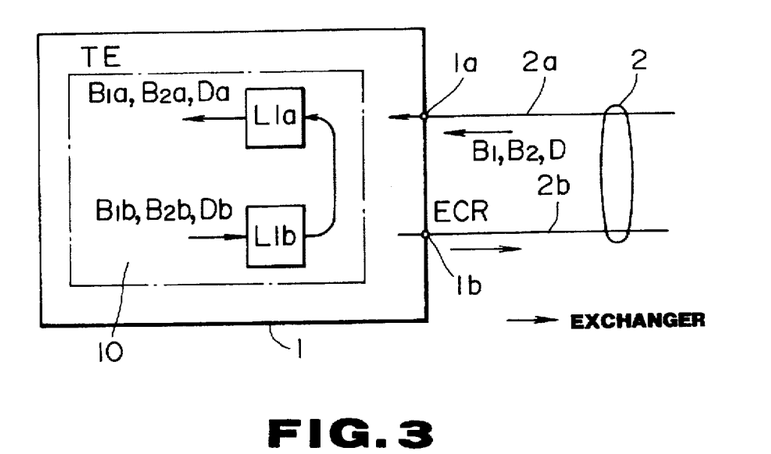
FIG. 3 is a block diagram showing a testing state of the communication unit in accordance with a first embodiment of a communication system testing method.

Hereinafter, embodiments of the present invention are described by reference to drawings. FIG. 3 shows a block diagram for executing a system test by a communication system testing method of a first embodiment. This diagram is constructed similar to the diagrams shown in FIGS. 1 and 2. Therefore, the same reference numerals are used in the embodiments to represent similar components. In FIG. 3, numeral 10 designates an integrated communication control circuit having RAM (random access memory), ROM (read only memory), a signal processor L1$a$, a signal processor L1$b$, and the like, incorporated in terminal equipment 1. The ROM stores micro-codes such as programming, and the RAM is used for a work area such as registers. Both the ROM and RAM are controlled by a programmable sequence stored in an external controller (not shown). Integrated communication control circuit 10 is a well known device, and therefore, its detailed description is omitted.

Figure 4:
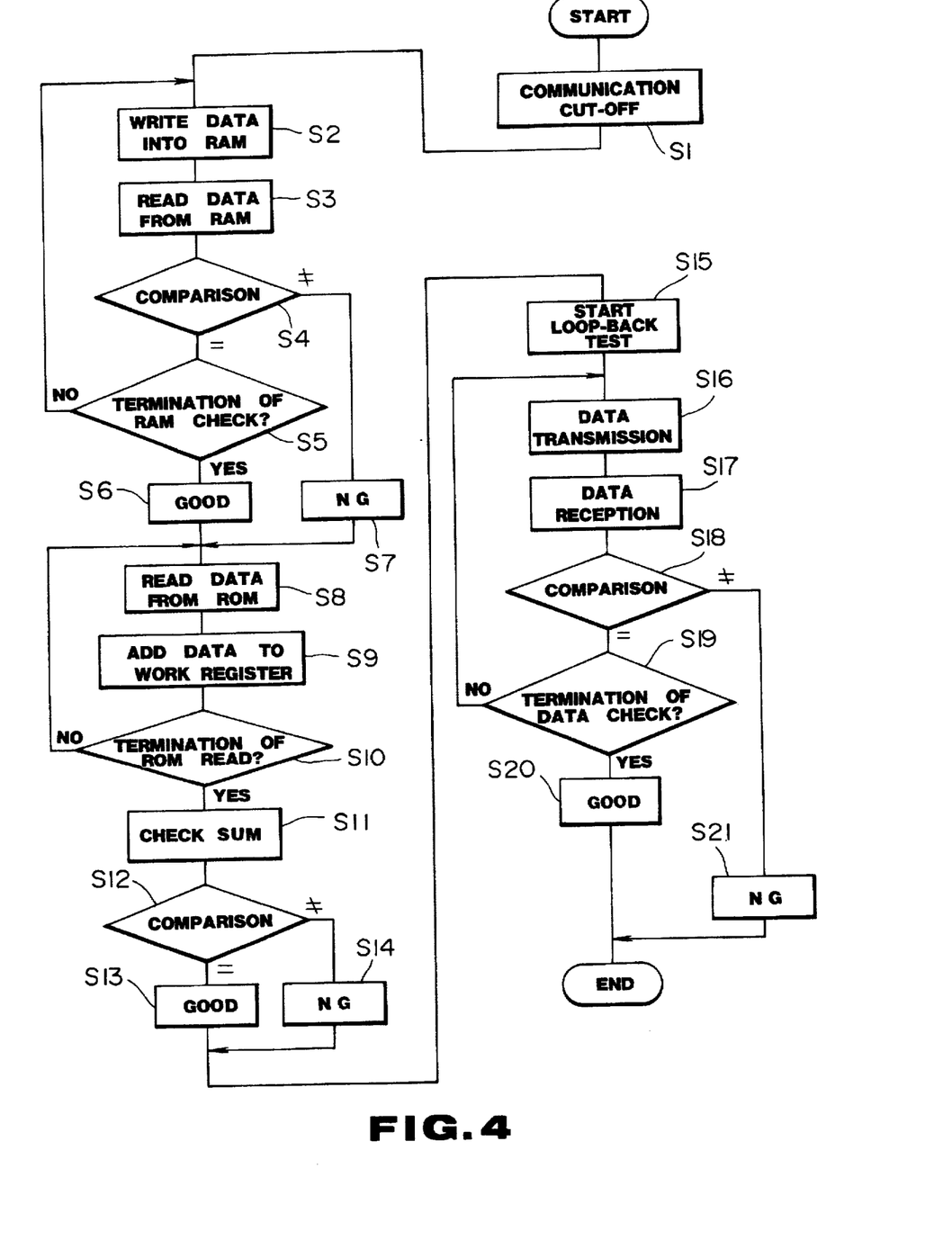
FIG. 4 is a flow chart showing a testing process in accordance with the first embodiment of the communication system testing method.

The communication system testing method is now described by reference to the flow chart shown in FIG. 4.

In step S1, referring to FIG. 3, when a test control unit actuates the test mode, signal lines of integrated communication control circuit 10 are switched to a state which is ready for the system test. Thus, integrated communication control circuit 10 does not process test data $B_1$, $B_2$, and D input from receiving terminal 1$a$ through incoming line 2$a$. Integrated communication control circuit 10 also outputs an external communication rejecting signal ECR to outgoing line 2$b$ through transmitting terminal 1$b$, thereby disconnecting integrated communication control circuit 10 from other communication units through communication line 2.

The test operation of the RAM (random access memory) is then executed in accordance with the following steps.

In step S2, test data is written into the RAM. In step S3, test data is read from the RAM. In step S4, the comparing process decides whether both written and read test data are equal or not. If the decision is "equal", the process moves to step S5, otherwise it moves to step S7.

In step S5, the process decides whether the system test is terminated through all addresses of the RAM or not. If the decision is "No", the address of the RAM is incremented by a next address number, and the process returns to step S2. If the decision is "Yes", the process moves to step S6.

In step S6, the process decides function of the RAM is normal. On the other hand, in step S7, the process decides function of the RAM is abnormal, that is, one address of the RAM has a problem.

The test operation of the ROM is then executed in accordance with the following steps.

In step S8, one word of test data is read from the ROM, and the one word of test data is added to a work register in step S9.

In step S10, the process decides whether both reading and adding processes are terminated in accordance with the addresses of the ROM or not. If the decision is "Yes", the process moves to step S11, otherwise it returns to step S8.

In step S11, test data, as "Check Sum", is read from the last address of the ROM. The test data "Check Sum" indicates the sum value of test data stored in the rest of the ROM address, except for the last address.

In step S12, the process decides whether test data "Check Sum" is equal to data stored in the work register, or not. If the decision is "equal", the process moves to step S13, otherwise it moves to step S14.

In step S13, the process decides that function of the ROM is normal. In step S14, the process decides that function of the ROM is abnormal.

The loop-back test is then executed for function of signal processor L1$a$ in receiving, and function of signal processor L1b in transmitting, in accordance with the following steps. A loop-back switching function is required to supply the test data to signal processor L1a so that the test data returns to the signal processor L1a before transmitting it to outgoing line 2b, as shown in FIG. 3.

Figure 5:
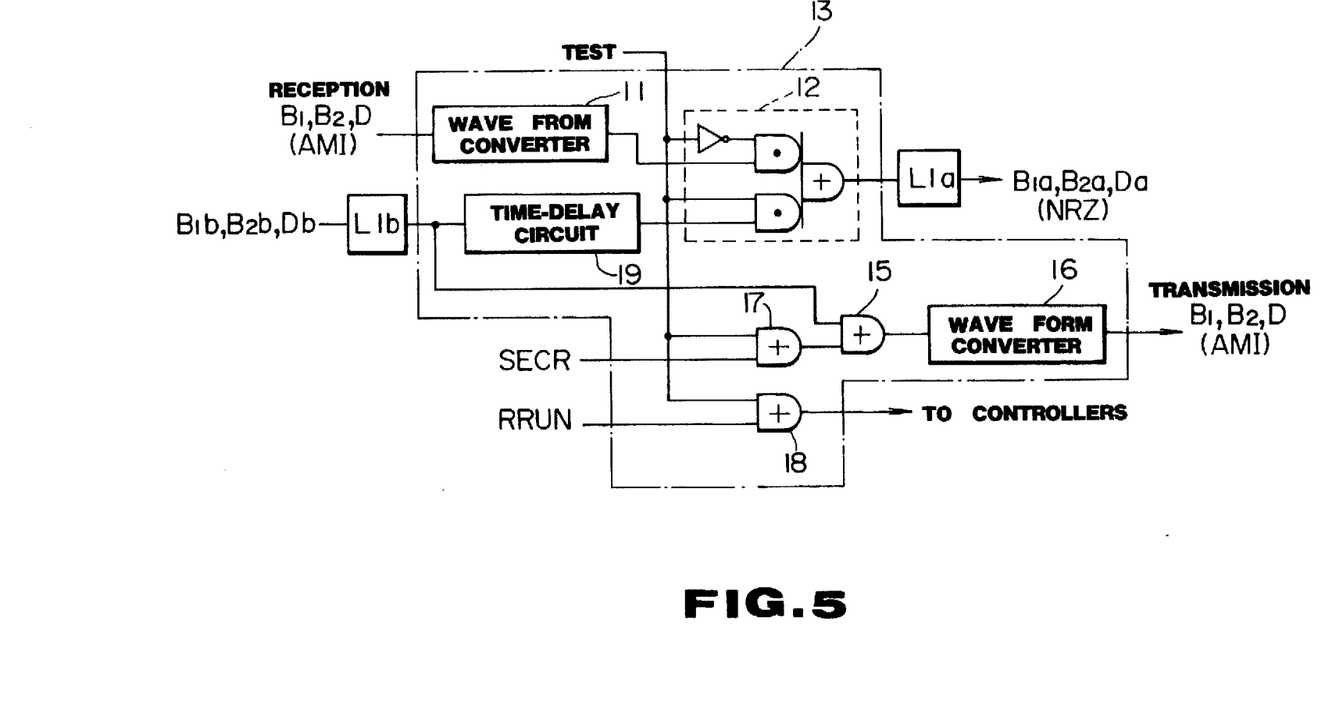
FIG. 5 is a circuit diagram showing a switching circuit for use in the loop-back test of the communication system testing method.

FIG. 5 shows a switching circuit 13 having the loop-back switching function. In the normal mode, first received test data $B_1$, $B_2$, and D inputted from incoming line 2a is converted from the AMI (Alternate Mark Inversion) wave form into the NRZ (Non Return to Zero) wave form by wave form converter 11. Afterwards, the NRZ wave form is supplied to signal processor L1a through selector 12 to process its wave form. Signal processor L1a generates test data $B_{1a}$, $B_{2a}$, and $D_a$. On the other hand, second received data $B_{1b}$, $B_{2b}$, $D_b$ is supplied to signal processor L1b. The second received data $B_{1b}$, $B_{2b}$, $D_b$ is based on the first received data $B_1$, $B_2$, and D, which is input from an internal line. The test data $B_{1b}$, $B_{2b}$, and $D_b$ is processed in signal processor L1b to supply the processed test data, as the NRZ wave form, to wave form converter 16 through OR gate 15. Wave form converter 16 converts the NRZ wave form into the AMI wave form to transmit as test data $B_1$, $B_2$, and D to outgoing line 2b.

On the other hand, when the normal mode is changed to the test mode, a test-mode indication signal TEST becomes "1". Therefore, the output of OR gate 17 becomes "1", and then the output of OR gate 15 becomes "1". Thus, a timely continuous signal "1" is transmitted, as the external communication rejecting signal ECR, from wave form converter 16 to outgoing line 2b. Accordingly, integrated communication control circuit 10 is disconnected from other communication units. This is a detailed description of step S1 as shown in FIG. 4.

When integrated communication control circuit 10 starts a communication with other communication units, a process start signal RUN is supplied to a control circuit. The control circuit is not shown in FIG. 5, but this is a well known circuit. When the control circuit receives the process start signal RUN from a starting circuit, or the like, this circuit detects the process start signal RUN, and then supplies a detecting signal RRUN to OR gate 18 of switching circuit 13. Thus, a signal "1" is output from OR gate 18 to be supplied to other controllers, which sets "enabling state", thereby allowing actuation of their processes. However, when the external communication rejecting signal ECR is transmitted to outgoing line 2b in the test mode, the process start signal RUN is no longer supplied from the other circuit, so that the other controllers do not set "enabling state". Thus, when the test-mode indication signal TEST becomes "1", integrated communication control circuit 10 forcibly transmits enabling signal "1" to each controller through OR gate 18, so that each controller is actuated similarly to the normal mode so that each controller which is an object of the test is able to be tested in the normal mode, in the enabling state for the external signal.

Referring back to FIG. 4, in step S15, actuating the loop-back test generates second received data $B_{1b}$, $B_{2b}$, and $D_b$, thereby making stand-by for the loop-back test.

In step S16, signal processor L1b processes the second received data $B_{1b}$, $B_{2b}$, and $D_b$, and the processed test data is transmitted to time-delay circuit 19 which makes a time-delay. The delayed signals are supplied to signal processor L1a through selector 12.

In step S17, signal processor L1a generates test data $B_{1a}$, $B_{2a}$, and $D_a$.

Time-delay circuit 19 is used for shift compensation of a bit-phase which is caused by the signal process, when signal processors L1b and L1a process the test data. That is, in CCITT specification, when terminal equipment 1 receives the test data from incoming line 2a, it has decided that the test data is transmitted to outgoing line 2b with a time-delay of two-bits from received signals. Thus, the construction of integrated communication control circuit 10 is based on that specification. Accordingly, when the test data is compared with original test data after processing in signal processors L1b and L1a, the shift of two-bits is caused for the above reason in spite of the fact that the process is normal. Thus, in integrated communication control circuit 10, the test data is delayed by time-delay circuit 19 in loop-back test, thereby adjusting a time of the test data at incoming and outgoing sides of signal processors L1b and L1a.

In step S18, the process compares the second received data $B_{1b}$, $B_{2b}$, and $D_b$ which is transmitted in step S16; and test data $B_{1a}$, $B_{2a}$, and $D_a$. If the decision is "equal", the process moves to step S19, otherwise it moves to step S21.

In step S19, the process decides whether the comparison of the test data is terminated or not. If the decision is "Yes", the process moves to step S20, otherwise it returns to step S16.

In step S20, the process decides that signal processors L1b and L1a are normal. While, in step S21, the process decides that one of signal processors L1b and L1a has trouble.

Figure 6:
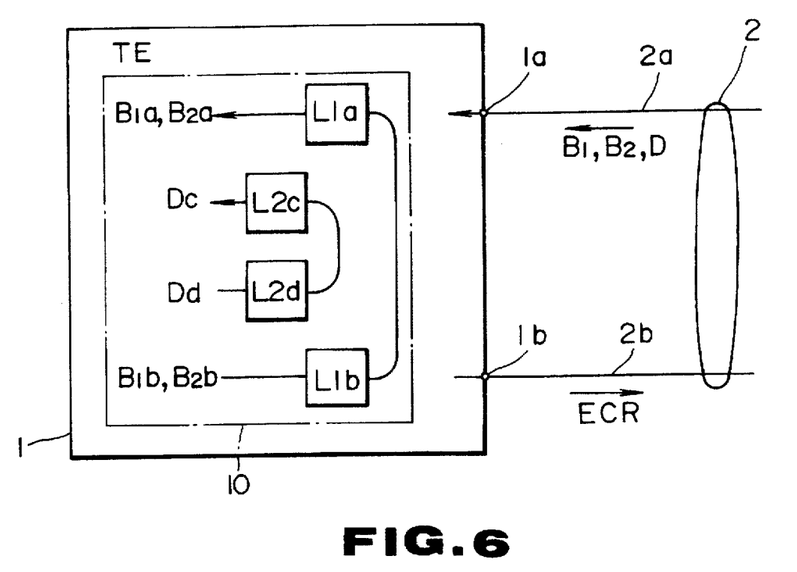
FIG. 6 is a block diagram showing a testing state of the communication unit in accordance with a second embodiment.

FIG. 6 shows another block diagram for executing the system test by a communication system testing method of a second embodiment.

According to FIG. 6, in the normal mode, the first received data $B_1$, $B_2$, and D which is received from incoming line 2a includes a signal corresponding to a low hierarchical process and a signal corresponding to a high hierarchical process. Signal processors L1a and L1b in integrated communication control circuit 10 correspond to the low hierarchical process, while signal processors L2a and L2b correspond to the high hierarchical process. For the loop-back test, a turning point is set in a processor related with the low hierarchical process and high hierarchical process to test for each process. That is, D-channel signal process turns at the turning point when the process of signal processor L2d is executed for third received data $D_d$, then the process of signal processor L2c is executed to obtain test data $D_c$, so that test data $D_c$ is compared with an original test data.

The system test including the loop-back test is then executed by the same method of the first embodiment as well as the test of the RAM and ROM.

Figure 7:
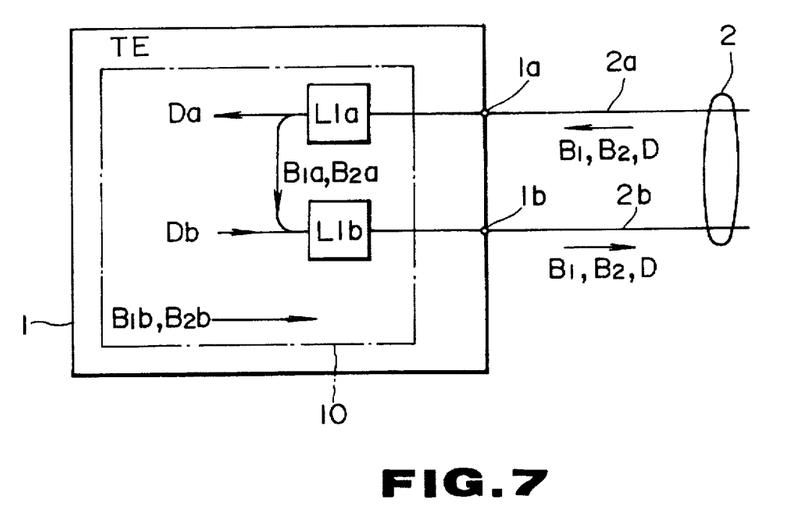
FIG. 7 is a block diagram showing a testing state of the communication unit in accordance with a third embodiment.

FIG. 7 shows another block diagram for executing a system test by a communication system testing method of a third embodiment. A first test is executed by the method which has already been described by reference to FIG. 1, that is, the test data which is received from incoming line 2a is directly transmitted to outgoing line 2b, thereby, in the side of the exchanger, testing whether communication line 2 has defects or not.

In a second test, when the first received data $B_{1a}$, $B_{2a}$, and $D_a$ is obtained from signal processor L1a by processing the test data $B_1$, $B_2$, and D. Test data $B_{1a}$ and $B_{2a}$ is processed by signal processor L1b to return it to outgoing line 2b, thereby, on the side of the exchanger, testing whether signal processors L1a and L1b have defects or not. On the other hand, first test data $D_a$ is processed similarly to the case of normal mode, thereby obtaining second received data $D_b$ from the above process. The second received data $D_b$ is processed by signal processor L1b, then transmitted to outgoing line 2b. Accordingly, in the test mode, the test operation depending on test data D is executed similarly to the case of the normal mode without disorder.

In a fourth embodiment, a first test, that is, the loop-back test, is executed by the same method of the third embodiment in FIG. 7 so that the test executes whether communication line 2 and integrated communication control circuit 10 have defects related to the receiving and transmitting functions, or not. In addition, a second test is executed by the same method of the first embodiment, thereby testing whether integrated communication control circuit 10 has defects related to the function of the signal process, or not, as well as defects related to the RAM and ROM, or not.

In a fifth embodiment, a first test, that is, the loop-back test, is executed by the same method of the third embodiment described above, thereby testing whether communication line 2 has defects up to integrated communication control circuit 10, or not. A second test is executed by the same method of the second embodiment, that is, the test is executed whether integrated communication control circuit 10 has defects related to the function of the signal process or not, as well as defects related to the RAM and ROM, or not.

In a sixth embodiment, a first test, as the loop-back test, is executed by the method of the third embodiment. A second test, as the loop-back test, is also executed by the method shown in FIG. 7. Each of the loop-back tests executes whether communication line 2 has defects up to integrated communication control circuit 10 or not, and whether integrated communication control circuit 10 has defects related to the function of receiving and transmitting data or not. In addition, a third test is executed by the method of first embodiment, thereby testing whether integrated communication control circuit 10 has defects related to the function of the signal process, or not, as well as defects related to the RAM and ROM, or not.

In a seventh embodiment, a first test, as the loop-back test, is executed by the method of the third embodiment. A second test, as the loop-back test, is also executed by the method shown in FIG. 7. Each of the loop-back tests executes whether communication line 2 has defects up to integrated communication control circuit 10, or not, and whether integrated communication control circuit 10 has defects related to the function of receiving and transmitting data, or not. In addition, a third test is executed by the method of the second embodiment, thereby testing whether integrated communication control circuit 10 has defects related to the function of the signal process, or not, as well as defects related to the RAM and ROM, or not.

Figure 8:
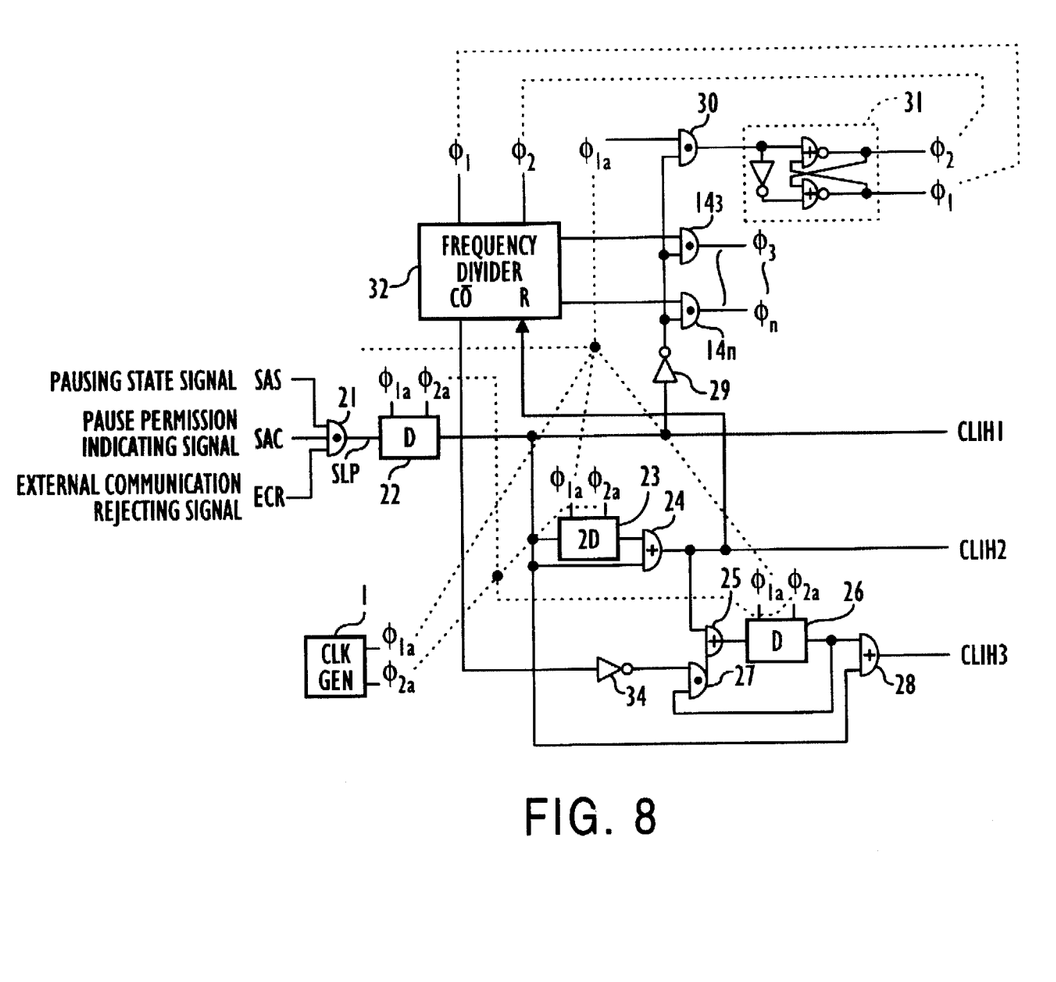
FIG. 8 is a circuit diagram showing a control apparatus for use in the communication system testing method.

FIG. 8 shows a control apparatus, more particularly, a low energy consumption type clock generation controller which is used in the communication system testing method previously described. In this drawing, Numeral 1 designates a clock generator which generates two-phase clocks $\phi_{1a}$ and $\phi_{2a}$, each of which has a period T and opposite phase with the other.

A mode-selector which is not shown in FIG. 8 generates a pausing state signal SAS, a pause permission indicating signal SAC, and an external communication rejecting signal ECR based on state of the test mode, in which the pausing state signal SAS becomes "1" when the integrated communication control circuit may be paused; the pause permission indicating signal SAC is used for processing an high hierarchical process of signals in the integrated communication control circuit, and when the integrated communication control circuit is not necessary to operate itself, the pause permission indicating signal SAC becomes "1"; and when a communication is not requested from other communication units, the external communication rejecting signal ECR becomes "1".

These signals SAS, SAC, and ECR are supplied to AND gate 21, thereby outputting a detecting signal SLP to time-delay circuit 22. The time-delay circuit 22 then generates a clock-inhibit signal CLIH1. The time-delay circuit 22 is of a single stage master-slave type flip-flop circuit, that is, when clock $\phi_{1a}$ is "1", time-delay circuit 22 reads the detecting signal SLP from AND gate 21, and when clock $\phi_{2a}$ is "1", this circuit outputs a clock-inhibit signal CLIH1 to the line. The clock-inhibit signal CLIH1 is supplied to time-delay circuit 23 and OR gate 24, when there is an output from OR gate 24.

The time-delay circuit 23 is of a double stage master-slave type flip-flop circuit actuated by clocks $\phi_{1a}$ and $\phi_{2a}$ similar to time-delay circuit 22. A clock-inhibit signal CLIH2 is supplied to another time-delay circuit 26 through OR gate 25, in which time-delay circuit 26 is similar to time-delay circuit 22. Time-delay circuit 26 outputs a clock-inhibit signal CLIH3 to a line through OR gate 28, and the clock-inhibit signal CLIH3 is returned to the input of time-delay circuit 26 through AND gate 27 and OR gate 25.

In the normal mode, when the detecting signal SLP is "0", each of the clock-inhibit signals CLIH1 and CLIH2 is "0", as well as the clock-inhibit signal CLIH3. The clock-inhibit signal CLIH3 is described later. Similarly, the clock-inhibit signal CLIH1 is "0", when the output of inverter 29 is "1". Because of this, the clock $\phi_{1a}$ is supplied to two-phase type clock generation circuit 31 to generate master-clocks $\phi_1$ and $\phi_2$. Each of the master-clocks $\phi_1$ and $\phi_2$ is supplied to frequency divider 32. Each output signal from the frequency divider 32 is supplied to each component of the circuit through AND gate $14_3$ to $14_n$. Accordingly, each of the clocks $\phi_3$ to $\phi_n$ is then supplied to the components of the integrated communication control circuit, thereby executing the normal mode in the integrated communication control circuit.

Figure 9:
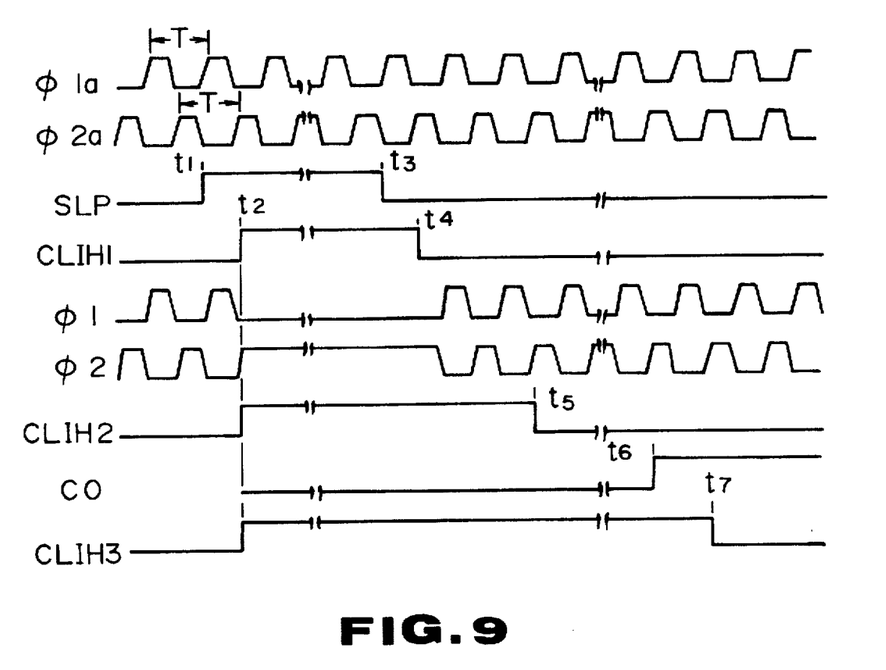
FIG. 9 is a time chart of wave forms in accordance with the operation of the control apparatus.

According to FIG. 9, the detecting signal SLP becomes "1" when each of the signals SAS, SAC, and ECR is "1" at time $t_1$, the clock-inhibit signal CLIH1 is "1" by the leading edge of the clock $\phi_{2a}$. Each of the clock-inhibit signals CLIH2 and CLIH3 also becomes "1" since the clock-inhibit signal CLIH1 is supplied to OR gates 24 and 28. Because of this, the supplied clock signal is negated in each component of the integrated communication control circuit. In addition, the clock-inhibit signal CLIH2 is supplied to frequency divider 32, thus, the frequency divider 32 is reset, and a carry-out signal CO which is output from frequency divider 32 becomes "0". When the clock-inhibit signal CLIH1 also becomes "1", the output of inverter 29 becomes "0", thereby stopping output of the master-clocks $\phi_1$ and $\phi_2$. Accordingly, the integrated communication control circuit is set to a pause state from time $t_2$. When one of the signals SAS, SAC, and ECR becomes "0", and also the detecting signal SLP becomes "0" in time $t_3$, the clock-inhibit signal CLIH1 becomes "0" at time $t_4$ by the leading edge of the clock $\phi_{2a}$, so that the output signal of inverter 29 becomes "1" to again start the generation of the master-clocks $\phi_1$ and $\phi_2$. Because of this, the circuit related to the master-clocks $\phi_1$ and $\phi_2$ again starts its operation.

Time of 2T is passed afterward, the clock-inhibit signal CLIH2 becomes "0" at time $t_5$. Thus, frequency divider 32 again starts its operation for counting the master-clocks $\phi_1$ and $\phi_2$. Frequency divider 32 then supplies the clocks $\phi_3$ to $\phi_n$ to each component of the circuit through AND gates $14_3$ to $14_n$. The integrated communication control circuit which is "enable state", starts its operation in accordance with the releasing of the clock-inhibit signals CLIH1 and CLIH2.

When frequency divider 32 counts predetermined numbers of the clocks, the carry-out signal CO from frequency divider 32 becomes "1" at time $t_6$. Because of this, the output signal of inverter 34 first becomes "0", then the output signal of AND gate 27 becomes "0", and also the output signal of OR gate 25 becomes "0". Afterwards, the output signal of time-delay circuit 26 becomes "0" by the leading edge of the clock $\phi_{2a}$, therefore, the clock-inhibit signal CLIH3 falls at time $t_7$. Because of this, the rest of components of the circuit start their operation. The output signal "0" of time-delay circuit 26 is returned to the input of time-delay circuit 26 through AND gate 27 and OR gate 25, therefore, the clock-inhibit signal CLIH3 remains "0". Accordingly, each of the clock-inhibit signals CLIH1 to CLIH3 is, in turn, released in accordance with a predetermined time interval, so that the integrated communication control circuit again starts its operation in the normal mode.

The preferred embodiment described herein is illustrative and not restrictive; the scope of the invention is indicated by the appended claims and all variations which fall within the claims are intended to be embraced therein.

What is claimed is:

1. A control apparatus for use in a testing method, the control apparatus being incorporated in a first communication unit which is connected with a second communication unit through a transit switch by communication lines for communicating with the second communication unit, the first communication unit having at least one integrated communication control circuit, the control apparatus comprising:

a main clock generator for generating a main clock signal;

pause control means for generating a detecting signal when the integrated communication control circuit simultaneously receives a first signal indicating that the integrated communication control circuit can be paused, a second signal for processing a hierarchical process of a given priority in the first communication unit, and a third signal indicating that a communication is not requested, so as to enter a pause state to await a request of a communication from the second communication unit;

a driving clock signal generator, responsive to said main clock signal, for generating a driving clock signal to drive said at least one integrated communication control circuit; and control means for stopping supply of the driving clock signal to each component of the integrated communication control circuit when the pause control means outputs the detecting signal so as to enter a low energy consumption state.

* * * * *